(12) United States Patent
Sato et al.

(10) Patent No.: US 6,237,955 B1
(45) Date of Patent: May 29, 2001

(54) SHOCK ABSORBING TYPE STEERING COLUMN APPARATUS

(75) Inventors: Kenji Sato, Gunma-ken; Isamu Chikuma, Maebashi; Sakae Matsumoto, Takasaki, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/400,539

(22) Filed: Sep. 21, 1999

(30) Foreign Application Priority Data

Sep. 21, 1998 (JP) .................................................. 10-266249

(51) Int. Cl.⁷ ........................................................ B62D 1/99
(52) U.S. Cl. ............................................................ 280/777
(58) Field of Search .............................................. 280/777

(56) References Cited

U.S. PATENT DOCUMENTS

| 3,785,671 | * | 1/1974 | Salewsky | 280/777 |
| 3,944,244 | * | 3/1976 | Albrecht | 280/777 |
| 4,228,695 | * | 10/1980 | Trevisson et al. | 280/777 |
| 4,943,028 | | 7/1990 | Hoffmann et al. | 248/548 |
| 5,378,021 | | 1/1995 | Yamaguchi et al. | 280/777 |
| 5,497,675 | * | 3/1996 | Brown et al. | 280/777 |

FOREIGN PATENT DOCUMENTS

| 0 240 116 | 10/1987 | (EP) . |
| 2 005 608 | 4/1979 | (GB) . |
| 2 142 713 | 1/1985 | (GB) . |
| 2 247 652 | 3/1992 | (GB) . |
| 2 323 146 | 9/1998 | (GB) . |
| 63-76578 | 5/1988 | (JP) . |
| 5-75057 | 10/1993 | (JP) . |

* cited by examiner

Primary Examiner—Kenneth Rice
(74) Attorney, Agent, or Firm—Vorys, Sater, Seymour and Pease LLP

(57) ABSTRACT

A shock absorbing steering column apparatus comprise a steering column member admitting an insertion of a steering shaft, and a shock absorbing member for permitting the steering column member to displace in an axial direction while being plastically deformed by an impact load applied in the axial direction of the steering column member. The steering column member and the shock absorbing member are integrally formed of a non-ferrous metal.

2 Claims, 17 Drawing Sheets

SHOCK ABSORBING TYPE STEERING COLUMN APPARATUS

This application claims the benefit of Japanese Patent Application No. 10-266249 which is hereby incorporated by reference.

BACKGROUND OF THE INVENTION

1. Field of the Invention

The present invention relates to a shock absorbing type steering column apparatus for an automobile.

2. Related Background Art

In the event of a collision of an automobile, subsequent to a so-called primary collision that the car collides against another car, there happens a so-called secondary collision that a driver collides against a steering wheel. For the purpose of protecting a life of the driver by minimizing an impact on the driver when the secondary collision happens, there has generally been adopted a system in which a steering shaft with the sheering wheel being fixed to one side end thereof is constructed as a so-called collapsible steering shaft of which an entire length is reduced when a strong impact is applied, and a steering column through which the steering shaft is inserted is structured as a shock absorbing steering column.

What is known as a shock absorbing steering column apparatus used for the purpose described above, is disclosed in, e.g., Japanese Utility Model Laid-Open Publication Nos. 63-76578 and 5-75057. The shock absorbing steering column apparatus, which has hitherto been known by the disclosures in those Publications, has a shock absorbing member provided between the steering column and a member for fixation to a car body etc. Upon the secondary collision, the shock absorbing member permits while being plastically deformed the steering column to displace forward, thereby relieving the impact exerted on the driver's body colliding against the steering wheel.

The conventional shock absorbing steering column apparatus explained above involves the use of the shock absorbing member independently of the steering column, which makes laborious all of parts manufacturing, a parts management and an assembly work and inevitably leads to a rise in costs.

SUMMARY OF THE INVENTION

It is a primary object of the present invention, which was devised under such circumstances, to provide a shock absorbing steering column apparatus capable of its being actualized at low costs by simplifying all of the parts manufacturing, the parts management and the assembly work.

To accomplish the above object, according to one aspect of the present invention, a shock absorbing steering column apparatus comprises a steering column member admitting an insertion of a steering shaft, and a shock absorbing member for permitting the steering column member to displace in an axial direction while being plastically deformed by an impact load applied in the axial direction of the steering column member. The steering column member and the shock absorbing member are integrally formed of a non-ferrous metal.

What can be preferably utilized as this non-ferrous metal may be a light alloy such as a magnesium die casting alloy of which a tensile strength is on the order of 220 MPa (210–230 MPa) and an elongation is approximately 6–10%. Further, what is specifically exemplified as this type of magnesium die casting alloy may be MD2B (magnesium alloy die cast 2-type B) specified by JIS H 5303, or AM50A, AM60A, AM60B etc specified by ASTM. Note that a lower limit of the tensile strength is required to be on the order of 210 MPa in terms of making it compatible to reduce a weight and ensure the strength of the steering column apparatus. By contrast, an upper limit thereof is not particularly regulated. As far as the elongation can be ensured, it is preferable that the tensile strength be higher. Similarly, a lower limit of the elongation is required to be approximately 6% for making the shock absorbing member plastically deformed without causing any cracks in order to ensure a necessary shock absorbing capability. In contrast with this, an upper limit thereof is not particularly regulated. So far as the tensile strength required can be secured, it is preferable that the elongation be larger. To summarize, a physical property required of the non-ferrous metal such as the magnesium die casting alloy etc for carrying out the present invention is that the elongation is over 6% and the tensile strength is over 210 MPa.

Further, a variety of structures of the shock absorbing member may be adopted on condition that the shock absorbing member permits the steering column member to displace forward when an impact load acting forward is applied to the steering column. For example, the following structures (1)–(4) can be considered.

(1) A pair of support walls extend forward at a front side end of the steering column member in a state where a steering shaft inserted through the steering column member is sandwiched in between the support walls from both sides, and one edges of a pair of bent portions each having a convex surface on its front surface side are formed in continuity from the front side ends of these support walls. Then, the other edges of these bent portions are formed in continuity from a fitting member for a fixing support on a car body.

(2) A honeycombed hollowed portion having multiplicity of cylindrical pieces nested in widthwise directions and in front and rear directions, is provided at a front or intermediate portion of the steering column.

(3) A fitting member for a fixing support on the car body through a suspension arm is provided on an upper surface of the front or intermediate portion of the steering column.

(4) The front or intermediate portion of the steering column is inserted through a through-hole formed in an annular or frame-like suspension arm. Then, a lower edge of the through-hole is connected via a connecting member to a lower surface of the steering column. Moreover, a fitting member for the fixing support on the car body is provided at an upper side end of the suspension arm.

In the thus structured shock absorbing steering column apparatus according to the present invention, the steering column member and the shock absorbing member are integrally formed of the non-ferrous metal, whereby the shock absorbing steering column apparatus can be actualized at low costs by simplifying all of the parts manufacturing, the parts management and the assembly work.

DESCRIPTION OF THE PREFERRED EMBODIMENTS

Figure 1:
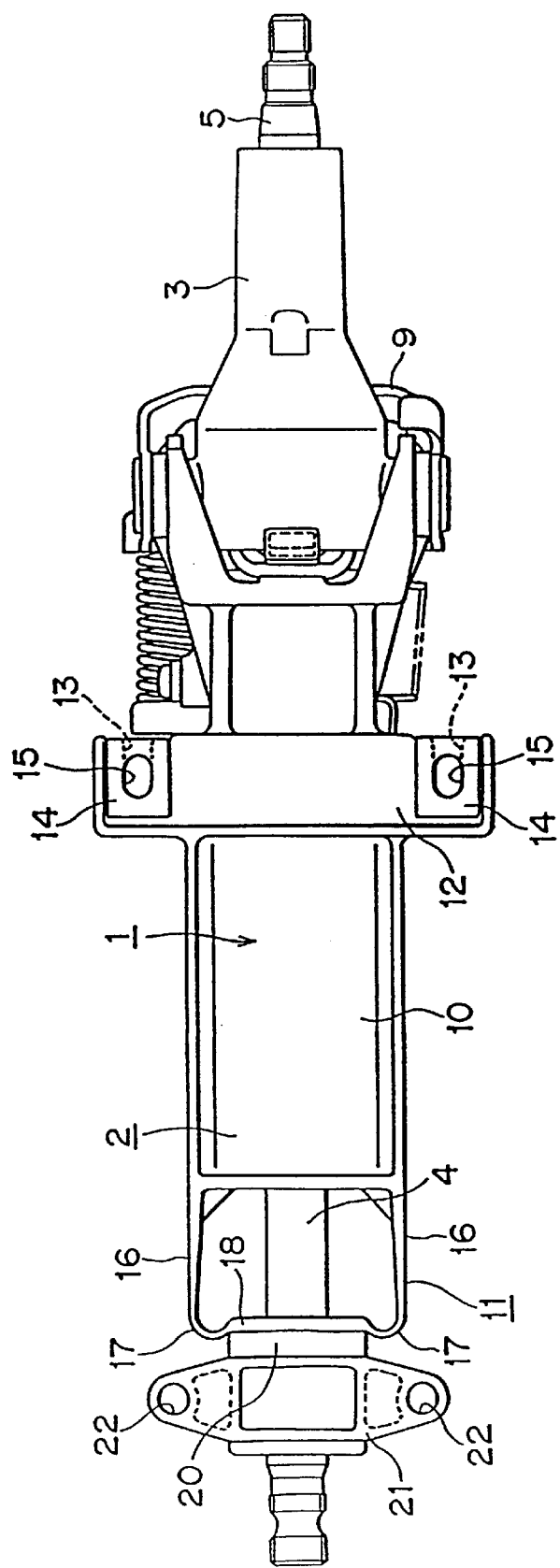
FIG. 1 is a plan view showing a first embodiment of the present invention in a normal state.
Figure 2:
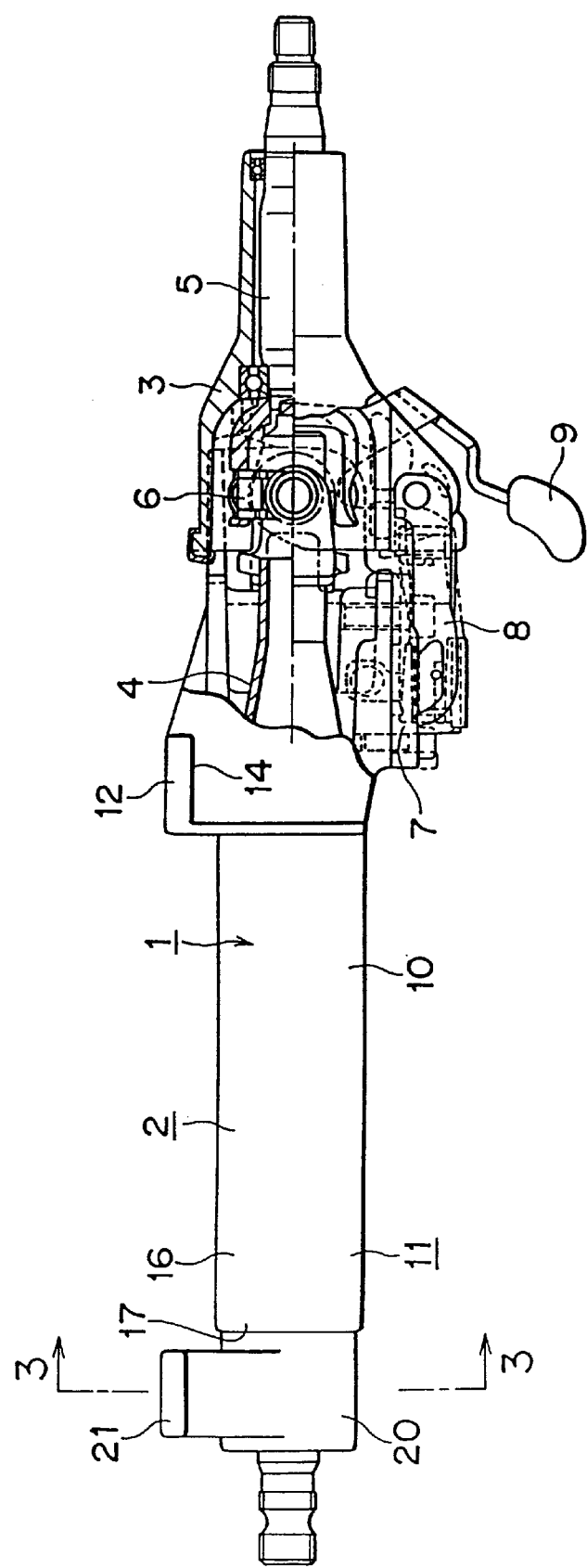
FIG. 2 is a partial longitudinal sectional side view similarly showing the first embodiment.
Figure 3:
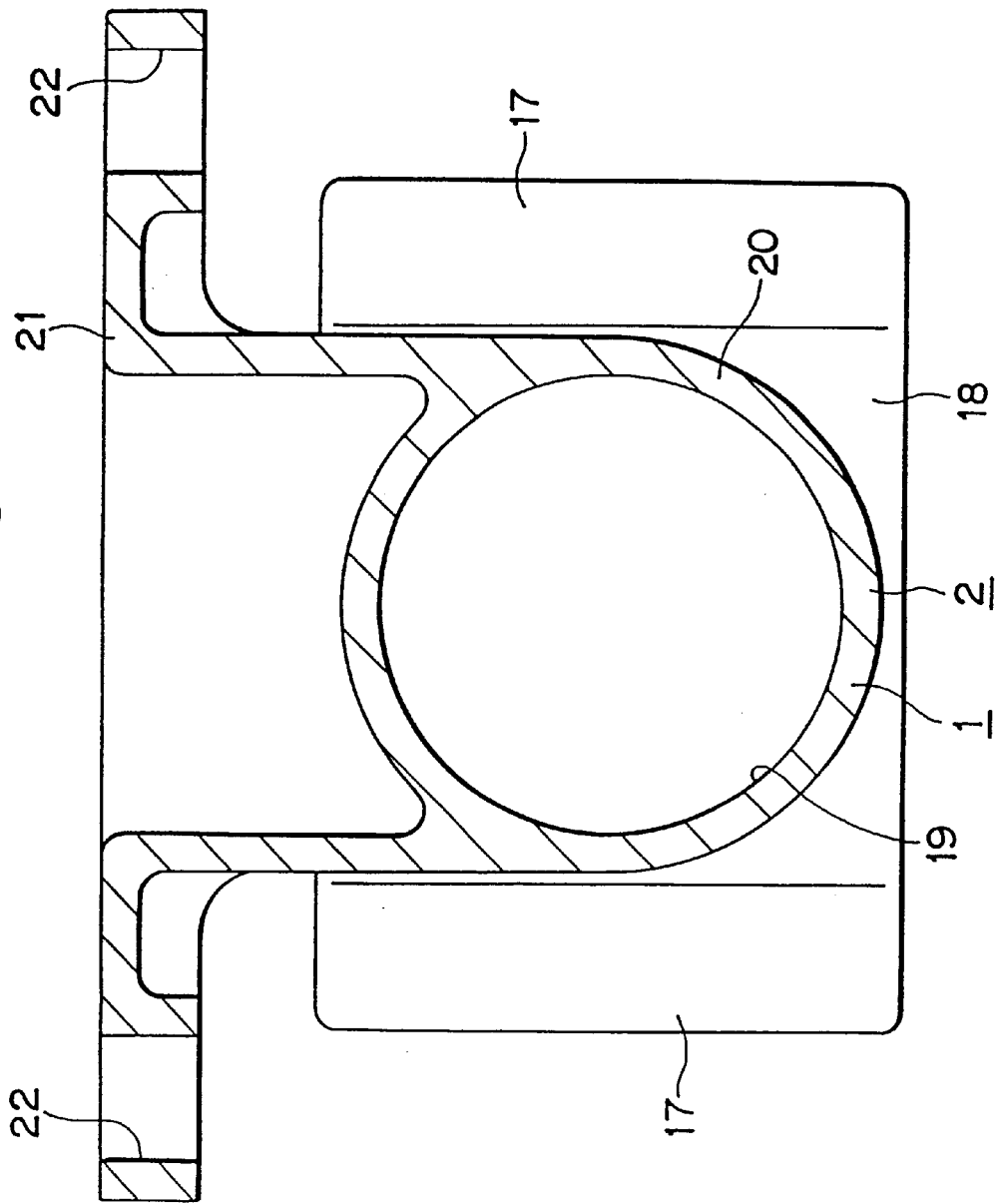
FIG. 3 is a sectional view taken along the line 3—3 in FIG. 2 with a steering shaft being omitted.

FIGS. 1–4 show a first embodiment of the present invention, which corresponds to the structure (1) described above. In this example, the present invention is applied to a so-called upper part locking tilt type steering column apparatus. This steering column apparatus has such a structure that a steering column 1 is constructed of two parts, i.e., a front steering column 2 and a rear steering column 3, and a front side end of the rear steering column 3 is so supported by a rear side end of the front steering column 2 as to be lockably, with a pair of right and left horizontal shafts being centered. A rear side end of a front steering shaft 4 supported rotatably within the front steering column 2, is connected via a universal joint 6 to a front side end of a rear steering shaft 5 supported rotatably within the rear steering column 3.

Note that a center of displacement of the universal joint 6 is concentric with a central axis of the pair of horizontal shafts or located in the vicinity of this central axis. Further, the front steering shaft 4 takes such a structure that an outer shaft is combined with an inner shaft as the necessity may arise, whereby an entire length is reducible just when an impact load is applied thereto. If an intermediate shaft connecting to the front side end of the steering shaft 4 takes a collapsible structure, however, the front steering shaft 4 may not necessarily take the collapsible structure. Further, an engaging/disengaging device including a fixed gear 7, a displacement gear 8 and a tilt lever 9 is provided between the front steering column 2 and the rear steering column 3. The rear steering column 3 is lockable with the pair of horizontal shafts being centered in a state where the displacement gear 8 is disengaged from the fixed gear 7 by operating the tilt lever 9, whereby a height position of an unillustrated steering wheel fixed to the rear side end of the rear steering shaft 5 becomes adjustable. By contrast, the rear steering column 3 is fixed in the above position in a state where the gears 7 and 8 mesh with each other, and the height position of the steering wheel is fixed. Note that a structure and an operation of the tilt adjustment of the tile type steering column described above have hitherto been well known and are not related to the gist of the present invention, and hence detailed explanations thereof are omitted. Further, the present invention can be embodied by its being applied not only to the upper part lockable tilt type steering column apparatus illustrated herein but also to a so-called lower part lockable tilt type steering column apparatus in which a front side end of a comparatively elongate single steering column is supported in a lockable manner.

In this example, the present invention is carried out by a contrivance related to the front steering column 2. Therefore, the front steering column 2 includes a steering column member 10 and a shock absorbing member 11. The thus structured steering column 2 is integrally formed by die-cast molding of a magnesium die casting alloy of which a tensile strength is on the order of 220 MPa and an elongation is approximately 6–10% such as MD2B (magnesium alloy die cast 2-type B) as specified by JIS H5303, and AM50A, AM60A, AM 60B specified by ASTM. The steering column member 10 of the structured steering column 2 is formed in a cylindrical shape enabling the front steering shaft 4 to be inserted into the column member 10.

At a rear upper surface portion of the steering column member 10, a rear fitting member 12 for supporting an upper portion of the steering column member 10 on a car body, is provided in a state where both of right-and-left side ends of the member 12 protrude from both of right-and-left sides of the steering column member 10. Then, cut-away portions 13, 13 opened on the side of a rear edge of the rear fitting member 12, are formed at both of the right-and-left side ends of the rear fitting member 12. When the rear portion of the steering column member 10 is supported on the car body, U-shaped slide plates 14, 14 are covered over the rear fitting member 12, and the rear fitting member 12 is supported on the car body by inserting a pair of bolts into through-holes 15, 15 formed in these slide plates 14, 14 and further into the above cut-away portions 13, 13. Upon a secondary collision, the slide plates 14, 14 slide on the rear fitting member 12, and the bolts thereby come off the cut-away portions 13, 13, thus permitting the front steering column 2 to displace forward. It is to be noted that the structure for thus supporting the rear fitting member 12 on the car body is not defined as an essence of the present invention, and other structures which have hitherto been known may also be adopted.

Further, the shock absorbing member 11, when an impact load acting forward is, subsequent to the secondary collision, applied to the rear side end of the front steering column 2, permits the steering column member 10 of the front steering column 2 to displace forward (leftward in FIGS. 1, 2 and 4) in an axial direction. Therefore, in this embodiment, a pair of right-and-left support walls 16, 16 are formed extending forward from both of the right and left sides of the front side ends of the steering column member 10. These two support walls 16, 16 are disposed in such a state that a front part of the steering shaft 4, which protrudes forward from the opening of the front side end of the steering column member 10, is sandwiched in between the support walls 16, 16 from both sides.

Then, one side edges of a pair of bent portions 17, 17 each having a convex surface on the front surface side and taking a partially cylindrical shape, are formed in continuity from the front side ends of the two support walls 16, 16. The other side edges of the two bent portions 17, 17 are connected to each other via a connecting plate 18. A through-hole 19 through which to insert the steering shaft 4 is formed in a central portion of the connecting plate 18. A cylindrical support drum 20 is provided at a portion surrounding the through-hole 19 as well as at a front surface of the connecting plate 18. Moreover, an upper surface of the support drum 20 is provided with a front fitting member 21 for fixedly supporting the front side end of the steering column 2 on the car body. The front fitting member 21 is formed upwardly of the support drum 20 in such a state as to protrude from both of the right and left sides of the support drum 20, and has through-holes 22, 22 through which bolts secured to the car body are inserted.

Figure 4:
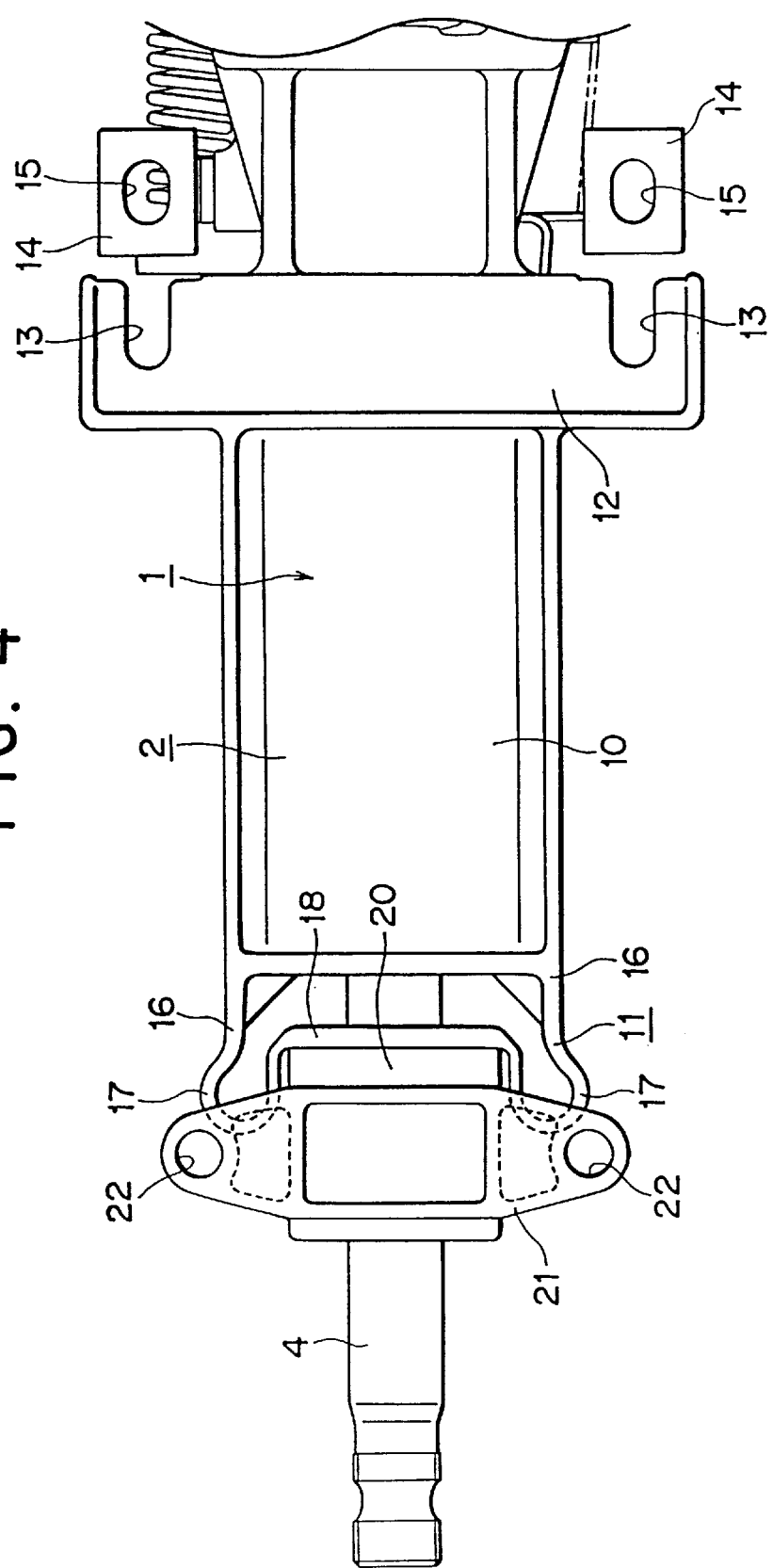
FIG. 4 is an enlarged view of a left part in FIG. 1, showing he first embodiment of the present invention in a state where a secondary collision happens.

In the case of the structure in this embodiment discussed above, upon the secondary collision, the steering column member 10 of the front steering column 2 displaces forward as shown in FIG. 4, at which time the pair of support walls 16, 16 and the bend portions 17, 17 which constitute the shock absorbing member 11 permit, making their plastic deformations, the steering column member 10 to displace forward. Namely, a distance between the opening of the front side end of the steering column member 10 and the connecting plate 18 is reduced while increasing a bending quantity of each of the bent portions 17, 17. Thus, with this forward displacement of the steering column member 10, when the support walls 16, 16 and the bent portions 17, 17 are plastically deformed, an impact energy applied to the steering wheel from the driver's body is absorbed. Therefore the driver can be protected by relieving the impact applied to the body of the driver.

Note that a thickness of each of the support walls 16, 16 becomes larger as it gets closer to the proximal end thereof in the illustrative embodiment. Accordingly, a load required for causing the plastic deformation of the shock absorbing member 11 becomes larger with a greater plastic deformation. In other words, a degree of absorbing the impact energy increases as the secondary collision gets intensified. This sort of characteristic is preferable for ensuring the protection of the driver. Note that this characteristic may arbitrarily be adjusted by changing the thickness and a width of each of the support walls 16, 16.

In the case of the shock absorbing type steering column apparatus of the present invention which is constructed and operates as described above, the steering column member 10 and the shock absorbing member 11 are integrally formed by the die cast molding of the magnesium die casting alloy of which the tensile strength is on the order of 220 MPa and the elongation is approximately 6–10%. It is therefore feasible to actualize the light-weight shock absorbing type steering column apparatus at low costs by simplifying all of the manufacturing and a management of the parts and an assembly work. Besides, the tensile strength is set to 220 MPa, whereby a sufficient strength can be ensured. That is, the tensile strength of 220 MPa is lower by approximately 5% than a tensile strength (230 MPa) of MDID (JIS, H 5303, and AZ91D in ASTM), i.e., a magnesium die casting alloy, which is at the present used for the light-weight steering column (incorporating no shock absorbing function). Accordingly, for example, as shown in FIGS. 1–4, a strength required can be secured with an attempt to attain a sufficient reduction in weight by forming reinforced ribs at a portion to which a stress is comparatively easy to apply.

Further, the elongation of the magnesium die casting alloy to be used is approximately 6–10%, and hence the support walls 16, 16 and the bent portions 17, 17 are plastically deformed without any occurrence of cracks, and capable of sufficiently absorbing the impact energy. In contrast with this, an elongation of MDID classified as a magnesium die casting alloy used for the light-weight steering column is as low as approximately 3%, and is therefore, with an occurrence of cracks subsequent to the plastic deformation, incapable of sufficiently absorbing the impact energy.

Figure 5:
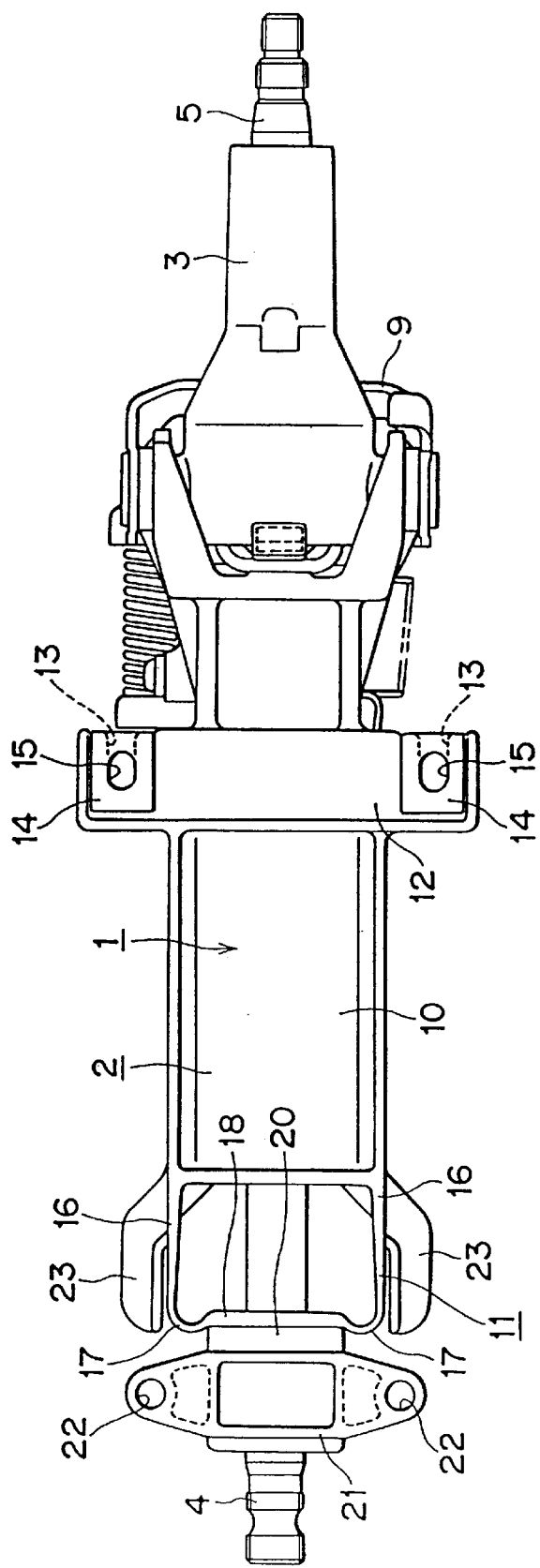
FIG. 5 is a plan view showing a second embodiment in a normal state.
Figure 6:
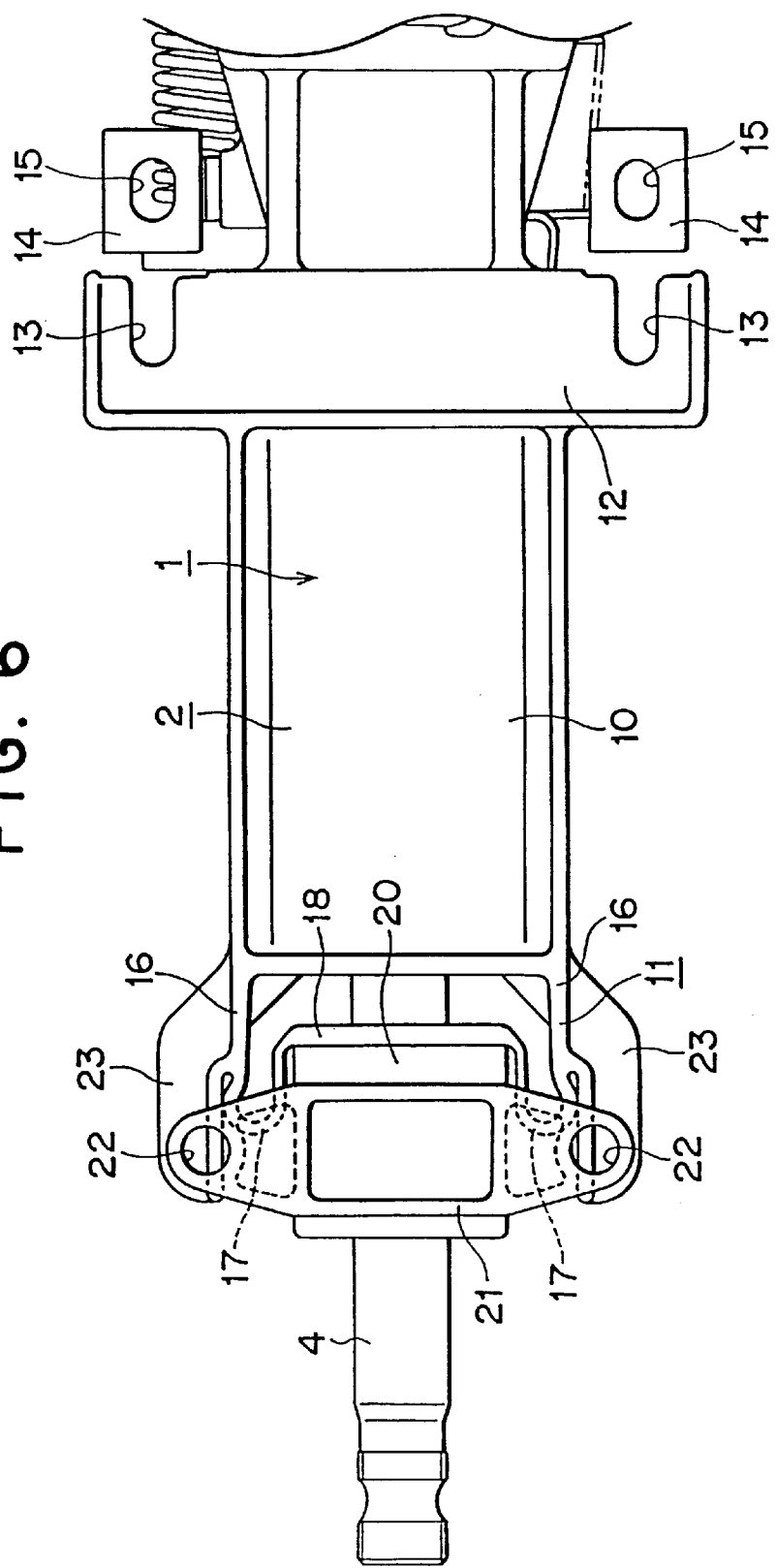
FIG. 6 is an enlarged view of a left part in FIG. 5, similarly showing the second embodiment in the state where the secondary collision happens.

Next, FIGS. 5 and 6 show a second embodiment of the present invention, which also corresponds to the structure (1) given above. In the case of this embodiment, proximal ends of guide arms 23, 23 are connected to outer surfaces of the rear side ends of the pair of right-and-left support walls 16, 16. Inner surfaces of these guide arms 23, 23 are parallel to each other and face in close proximity to outer surfaces of the support walls 16, 16 and of the bent portions 17, 17. The thus constructed guide arms 23, 23 work to prevent the bent portions 17, 17 from excessively protruding outward in the widthwise directions (in the up-and-down directions in FIGS. 5 and 6) when encountering the secondary collision, whereby the shock absorbing member 11 makes the plastic deformation with a stability. Accordingly, in the case of this embodiment, the driver can be protected more surely when encountering the secondary collision. The guide arms 23, 23 are integrally formed with the front steering column 2 together with the energy absorbing member 11, and therefore, with the provisions of these guide arms 23, 23, especially the parts management and the assembly work do not become laborious. Configurations and operations of other components are the same as those of the first embodiment discussed above, and hence the same components are marked with the like numerals with an omission of repetitive explanations thereof.

Figure 7:
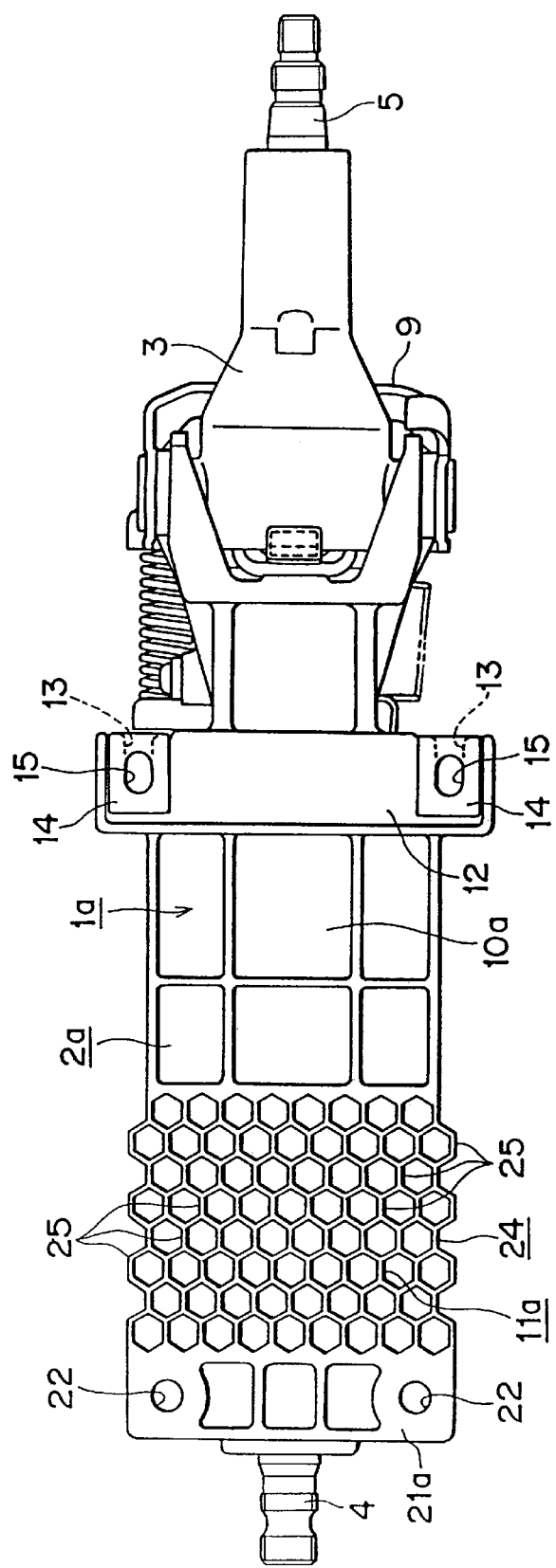
FIG. 7 is a plan view showing a third embodiment of the present invention in a normal state.
Figure 8:
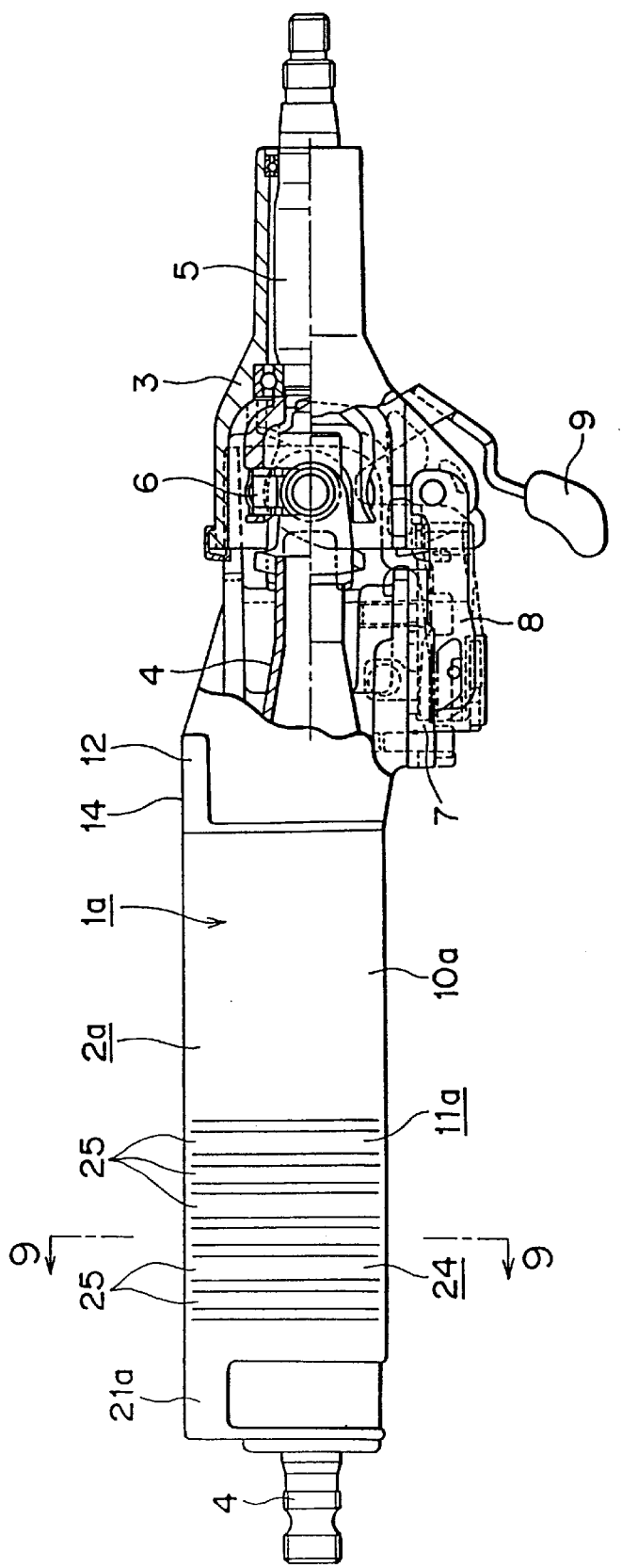
FIG. 8 is a partial vertical sectional side view similarly showing the third embodiment.
Figure 9:
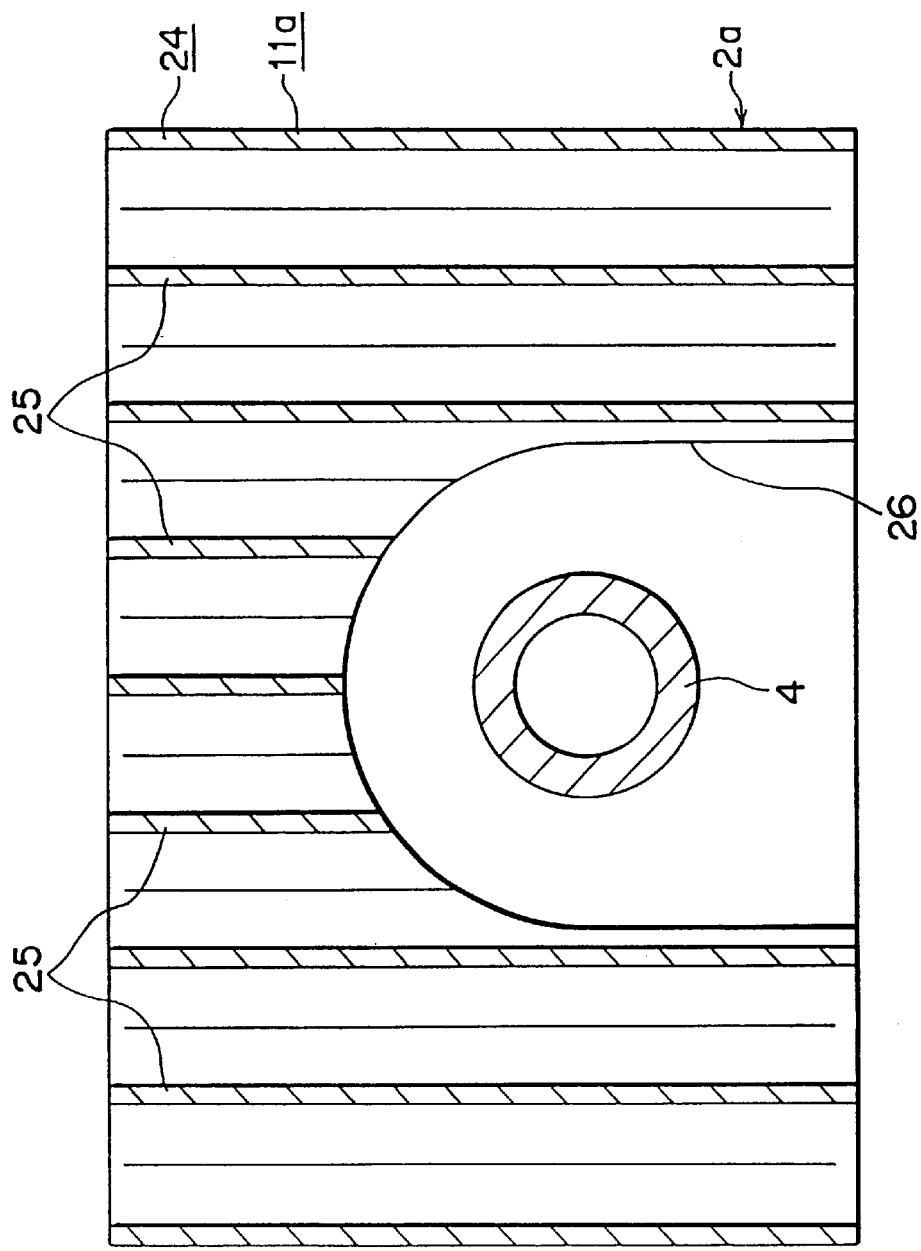
FIG. 9 is a sectional view taken along the line 9—9 in FIG. 8.
Figure 10:
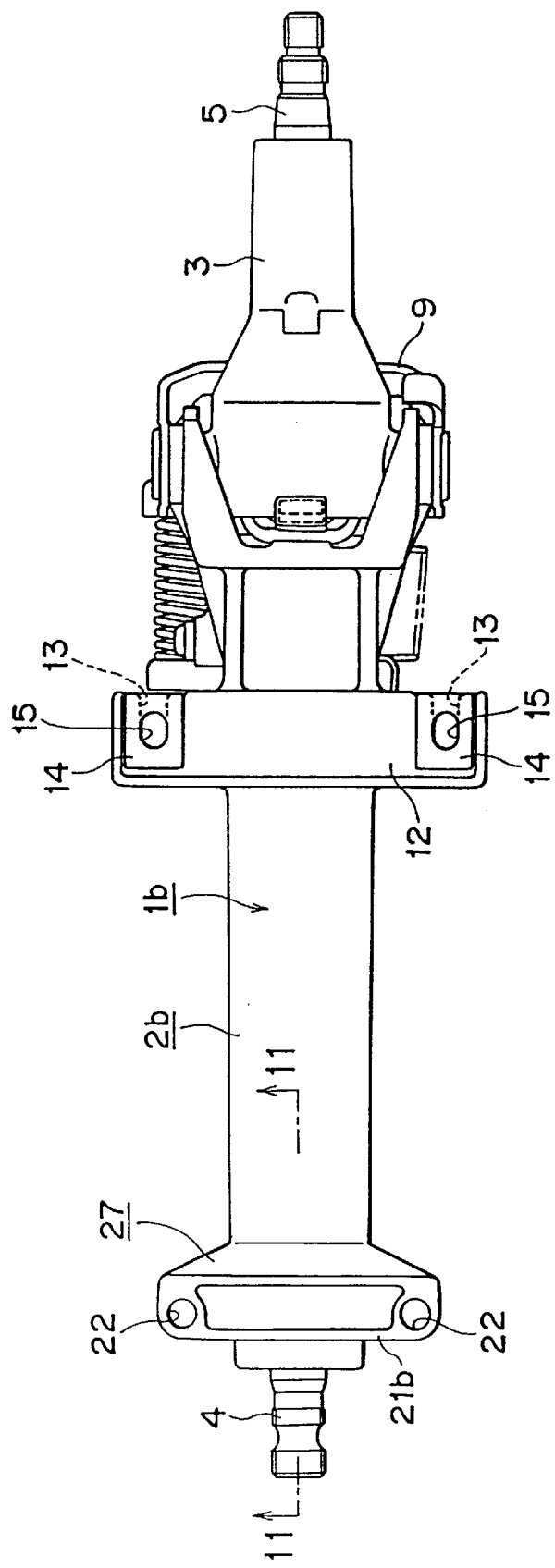
FIG. 10 is a plan view showing a fourth embodiment of the present invention in a normal state.
Figure 11:
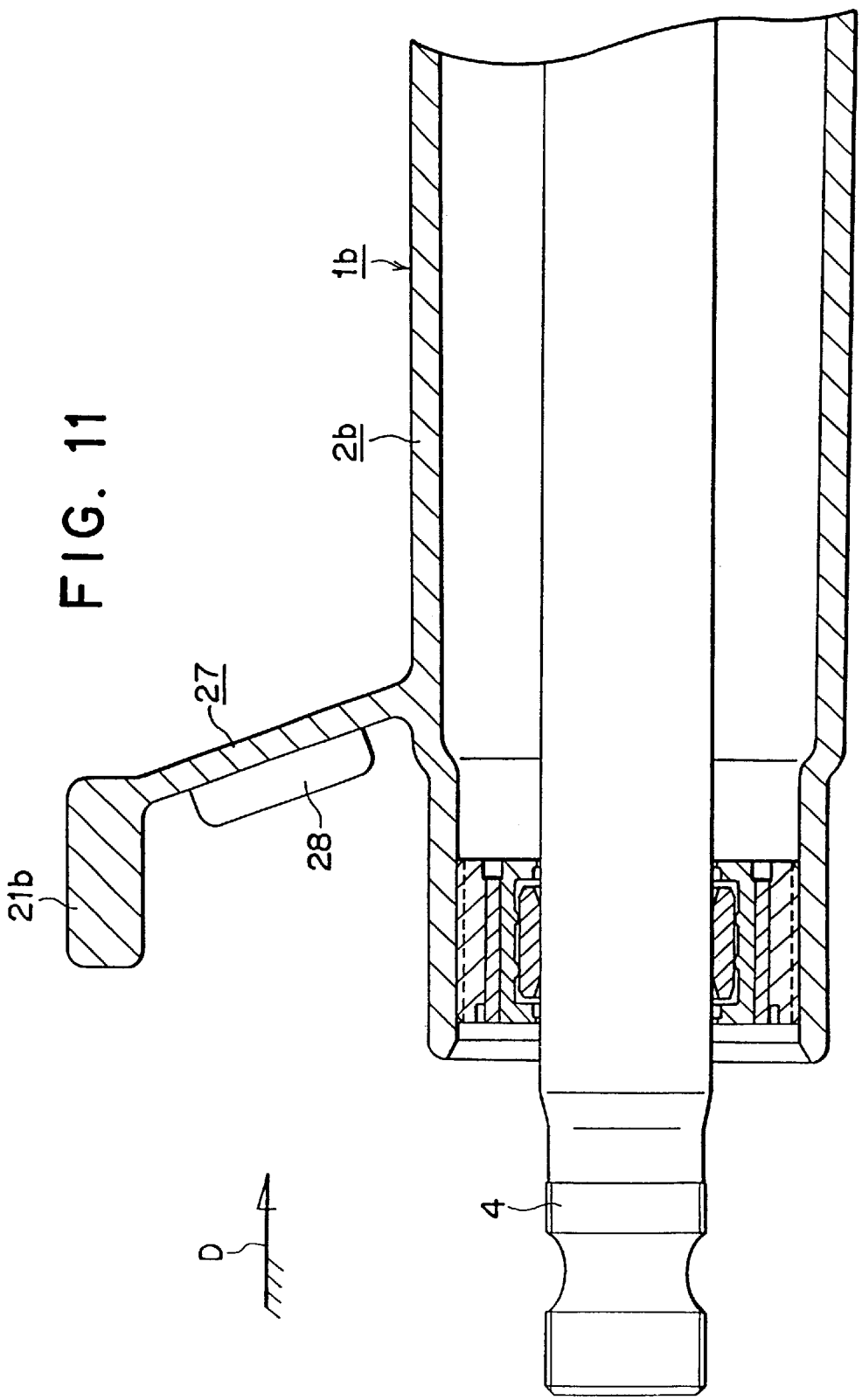
FIG. 11 is a sectional view taken along the line 11—11 in FIG. 10.
Figure 12:
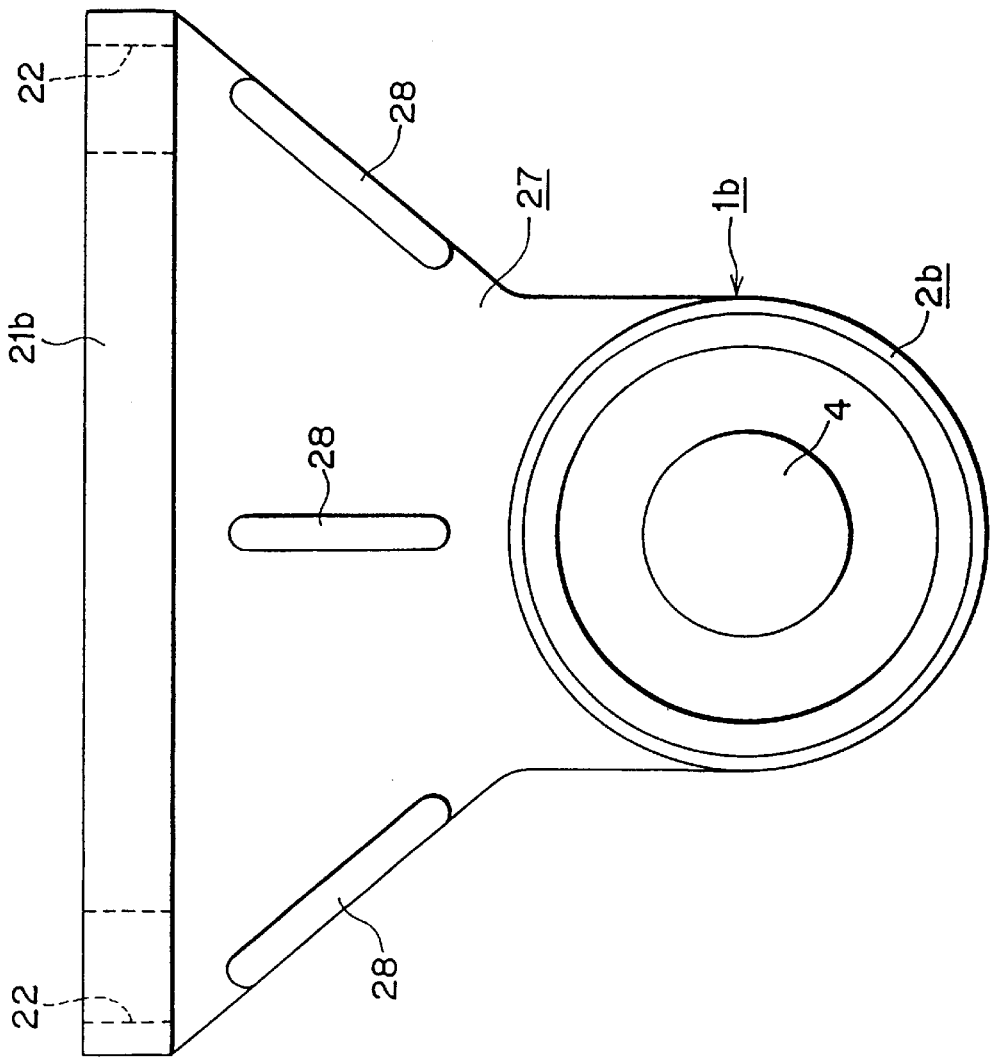
FIG. 12 is a view taken along the arrow line D in FIG. 11.

Next, FIGS. 7–9 show a third embodiment of the present invention, which corresponds to the structure (2) described above. In the case of this embodiment, a honeycombed hollowed portion 24 is formed in a front side area of an intermediate portion of a front steering column 2a combined with the rear steering column 3 to constitute a steering column 1a. In the case of the present embodiment of forming the honeycombed hollowed portion 24, the honeycombed hollowed portion 24 of the front steering column 2a serves as a shock absorbing member 11a for reducing a dimension in the axial direction (in the right-and-left directions in FIGS. 7 and 8) with the plastic deformation while absorbing the impact energy, and a member disposed on a more rear side (a right side in FIGS. 7 and 8) than the honeycombed hollowed portion 24, serves as a steering column member 10a.

The honeycombed hollowed portion 24 is, in the illustrative embodiment, constructed of a multiplicity of cylindrical pieces 25, 25 each taking an equilateral hexagon cylindrical shape which are nested in the widthwise directions (corresponding to the up-and-down directions in FIG. 7, the right-and-reverse side directions in FIG. 8, and the right-and-left directions in FIG. 9) and in the front and rear directions (corresponding to the right-and-left directions in FIGS. 7 and 8, and the right-and-reverse side directions in FIG. 9). A tunnel-like recessed portion 26 is, as shown in FIG. 9, formed extending in the axial direction in a central portion of the lower surface of the thus nested honeycombed hollowed portion 24 (the shock absorbing member 11a) in the axial direction, thereby enabling the intermediate portion of the front steering shaft 4 to insert therein. Further, the front side end of the front steering column 2a is provided with a front fitting member 21a for fixing the front side end of the front steering column 2a to the car body.

In the case of this embodiment constructed as described above, upon the secondary collision, when the steering column member 10a of the front steering column 2a displaces forward, the multiplicity of cylindrical pieces 25, 25 constituting the honeycombed hollowed portion 24 serving as the shock absorbing member 11a permit the steering column member 10a to displace forward while being plastically deformed so that these cylindrical pieces 25, 25 are crushed in the front and rear direction. Then, the impact energy applied to the steering wheel from the body of the driver is absorbed by the cylindrical pieces 25, 25 being plastically deformed. Therefore, the driver can be protected by relieving the impact applied to the driver's body. Note that in the case of carrying out the structure in this embodiment, the configuration of each of the cylindrical pieces 25, 25 is not necessarily limited to the equilateral hexagonal shape. However, other shapes and whatever plastically deformable in a direction crushable by the load acting in the front-and-rear direction such as a cylindrical shape and a rectangular cylindrical shape etc, may properly be selected and configured. Furthermore, the characteristic of absorbing the impact energy can be adjusted in a variety of ways by changing the configuration, a size and further a wall thickness of each of the multiplicity of cylindrical pieces 25, 25.

Next, FIGS. 10–13 shows a fourth embodiment of the present invention, which corresponds to the structure (4) described above. In the case of this embodiment, a lower side end of a suspension arm 27 constituting the shock absorbing member is integrally joined to an upper surface of a front side portion of the intermediate portion, of the front steering column 2b structuring the steering column 1b. Moreover, a front fitting member 21b defined as a fitting member for a fixing support on the car body, is integrally joined to the suspension arm 27 and to the front steering column 2b. Furthermore, reinforced ribs 28, 28 are formed respectively in three positions, in the widthwise direction, of a vertically intermediate portion of the front surface of the suspension arm 27, thereby increasing a flexural rigidity of the vertically intermediate portion of the suspension arm 27.

Figure 13:
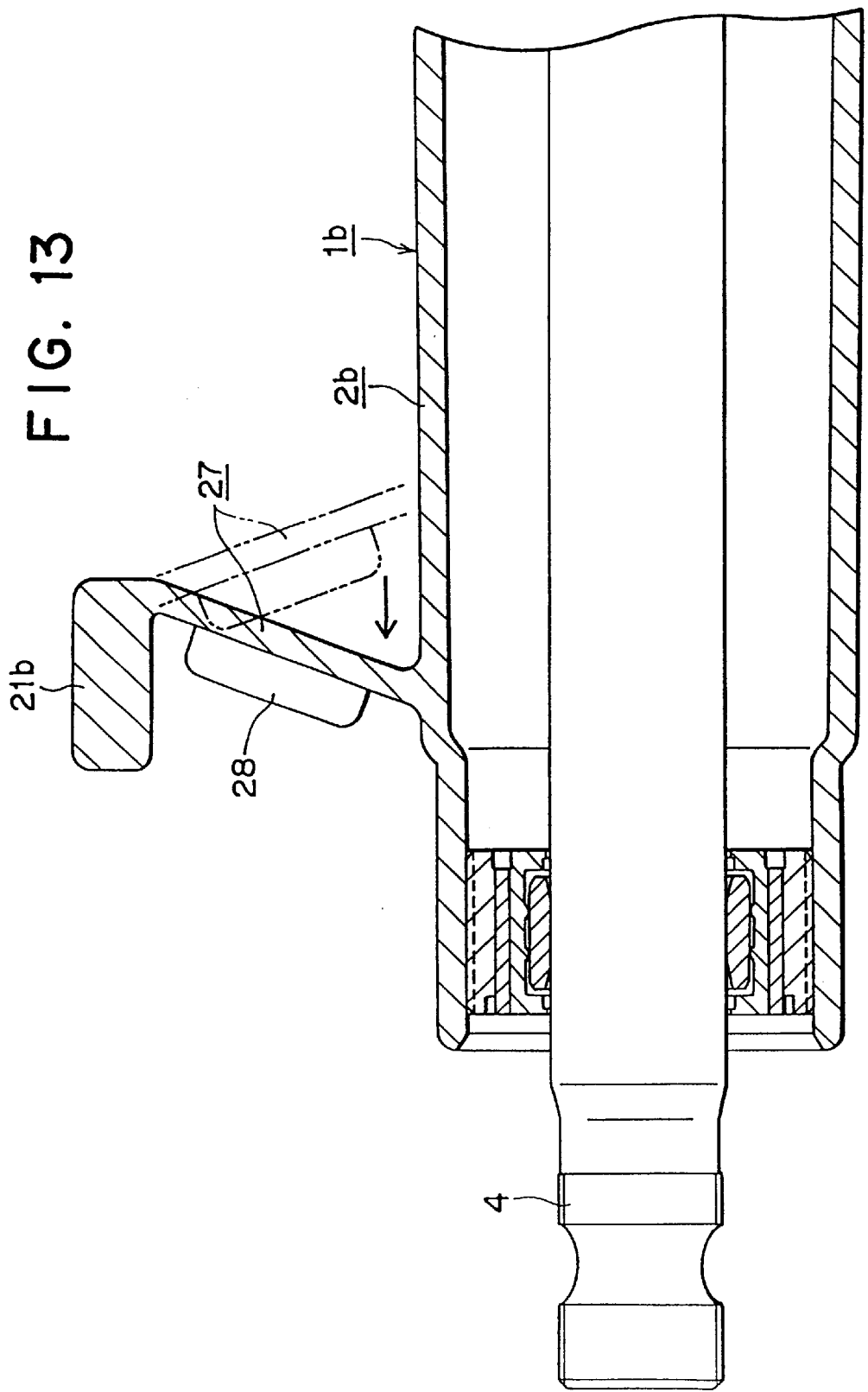
FIG. 13 is a sectional view similar to FIG. 11, showing the fourth embodiment of the present invention in the state where the secondary collision happens.
Figure 14:
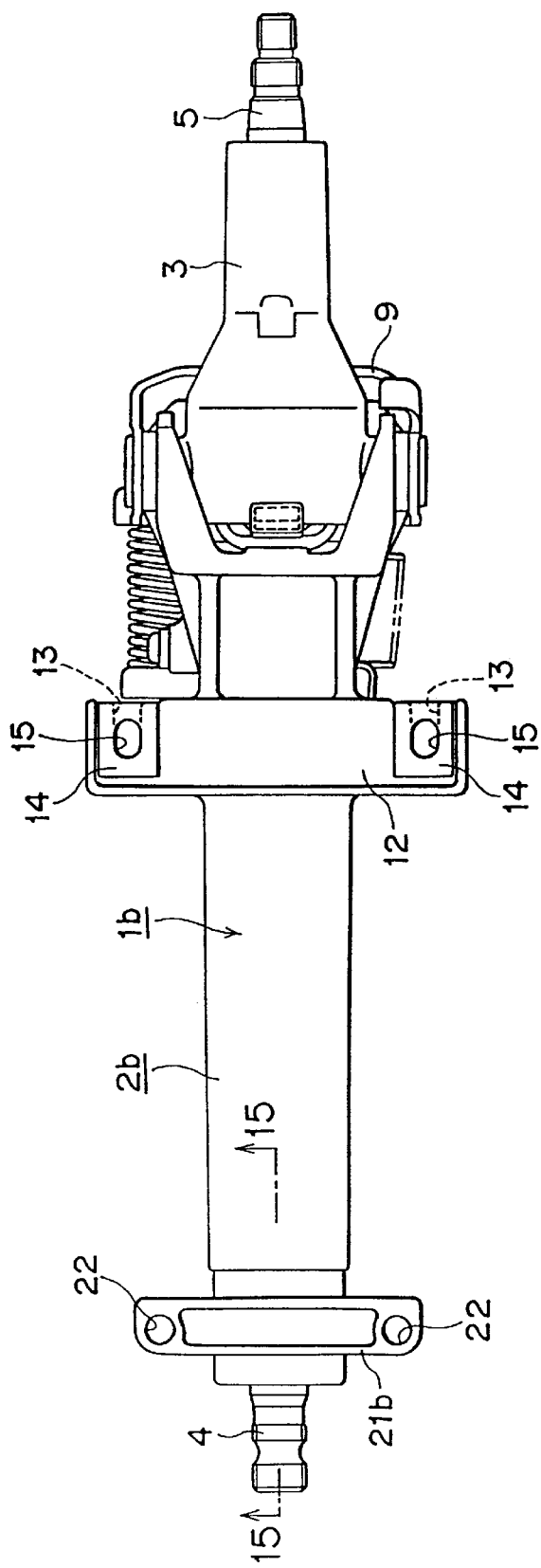
FIG. 14 is a plan view showing a fifth embodiment of the present invention in a normal state.
Figure 15:
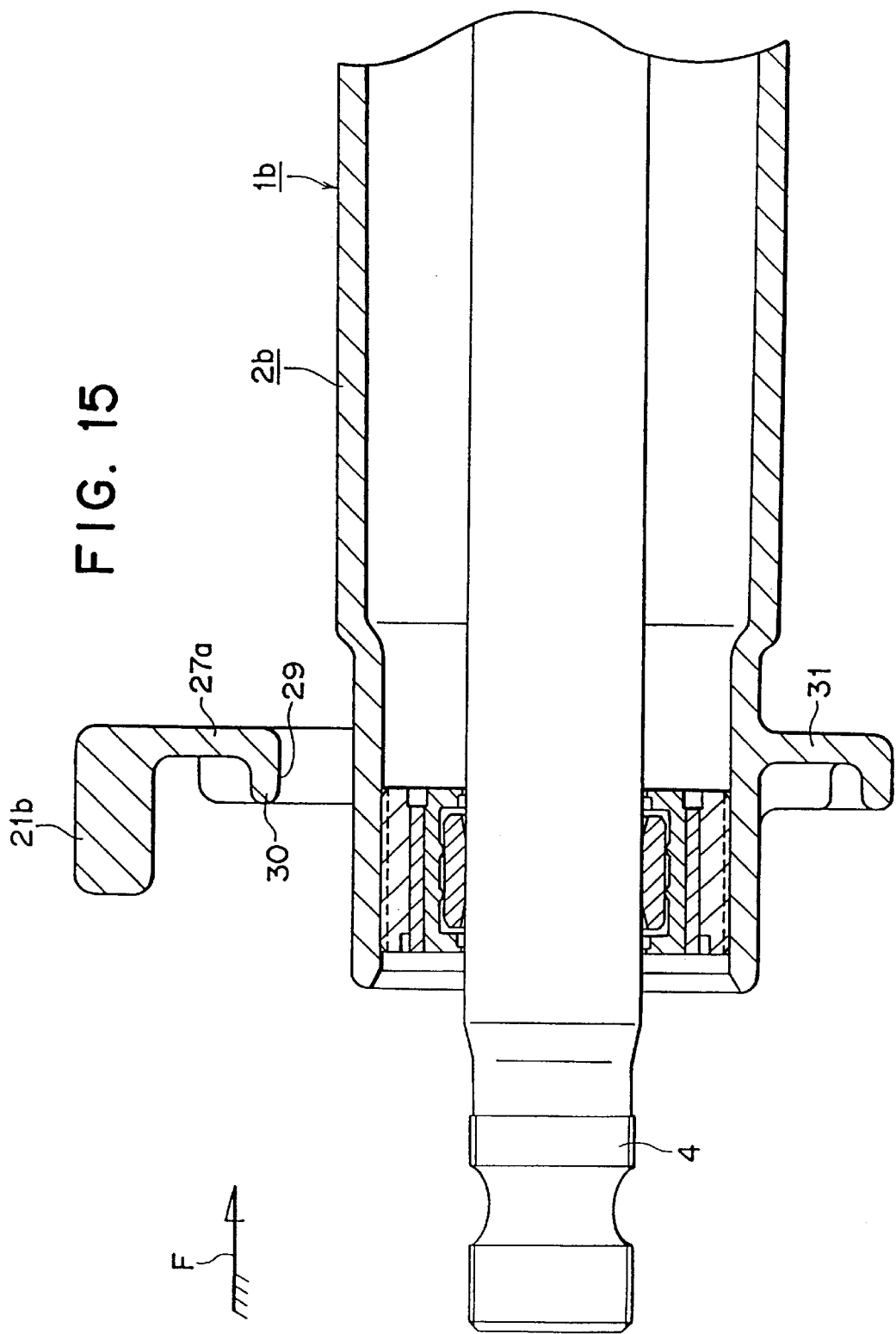
FIG. 15 is an enlarged sectional view taken along the line 15—15 in FIG. 14.
Figure 16:
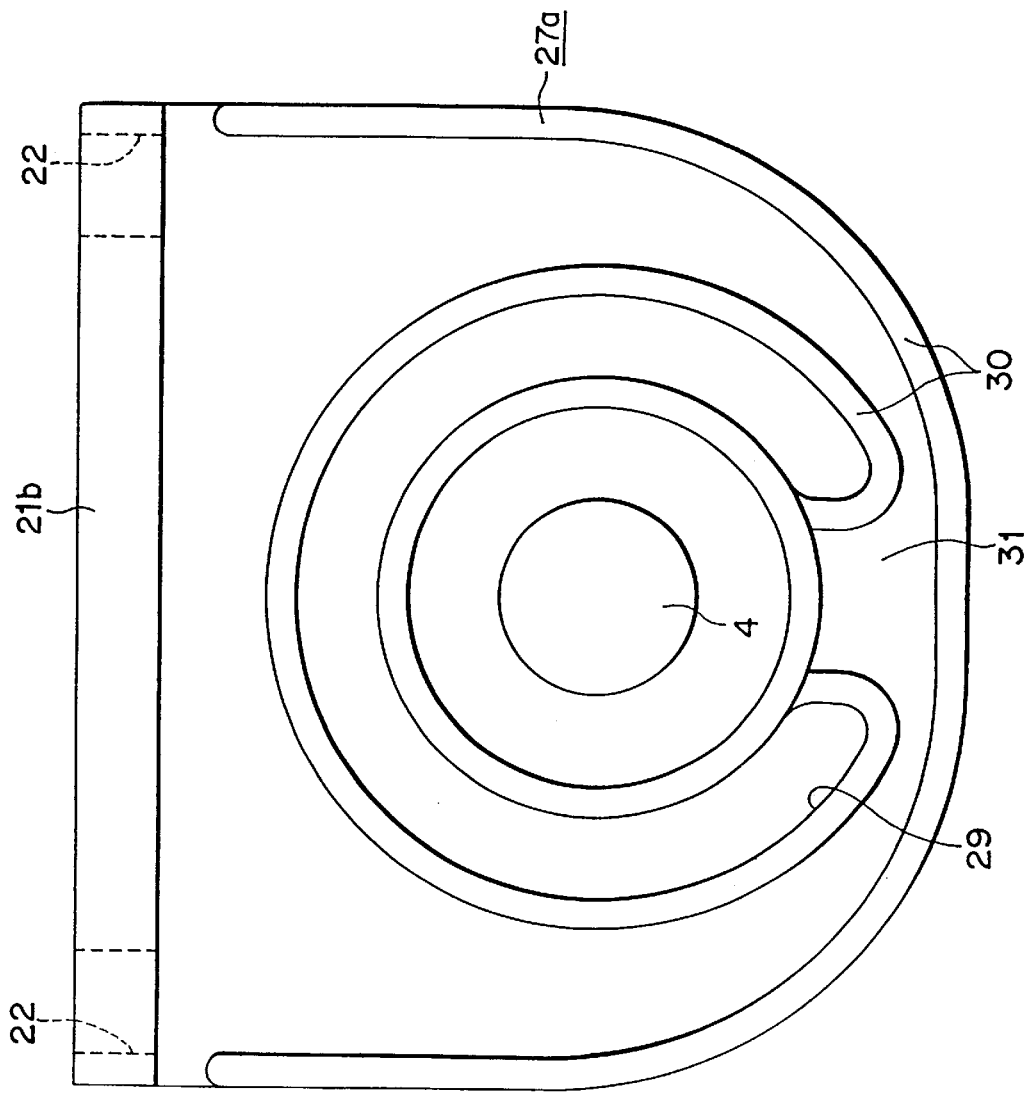
FIG. 16 is a view taken along the arrow line F in FIG. 15.

In the case of the present embodiment having the above construction, when the front steering column 2b as the steering column member is thrust forward subsequent to the secondary collision, as shown in FIG. 13, continuous portions between both of upper and lower side ends of the suspension arm 27 constituting the shock absorbing member, the upper surface of the front steering column 2b and the lower surface of the front fitting member 21b, permit the front steering column 2b to displace forward while being plastically deformed in such a direction as to change a bending angle. Then, when the continuous portions between both of upper and lower side ends of the suspension arm 27 constituting the shock absorbing member, the upper surface of the front steering column 2b and the lower surface of the front fitting member 21b are plastically deformed, the impact energy applied to the steering wheel from the driver's body is absorbed. Therefore, the driver can be protected by relieving the impact applied to the body of the driver. Incidentally, in the illustrative embodiment, with the contrivance that the reinforced ribs 28, 28 are provided, only the two continuous portions are plastically deformed with a stability. Accordingly, it is feasible to stabilize the action of absorbing the impact energy upon the secondary collision. Other configurations and operations are the same as those in the first embodiment discussed above, and hence the same components are marked with the like numerals with an omission of the repetitive explanations.

Next, FIGS. 14–17 illustrate a fifth embodiment of the present invention, which corresponds to the structure (4) described above. In the case of this example, the front portion of the front steering column 2b constituting the steering column 1b, is inserted through a through-hole 29 formed substantially in a central portion of an annular suspension arm 27a structuring the shock absorbing member. Then, a lower edge of the through-hole 29 is connected via a connecting member 31 to a front lower surface of the front steering column 2b. Further, reinforce dribs 30 are provided over a peripheral portion of the through-hole 29, which embraces the two side edges of the connecting member 31, and over an outer peripheral portion, exclusive of an upper side end of the suspension arm 27a, of the suspension arm 27a. Moreover, the front fitting member 21b for the fixing support on the car body is joined to the upper side end of the suspension arm 27a integrally with the suspension arm 27a and the steering column 2b as well.

Figure 17:
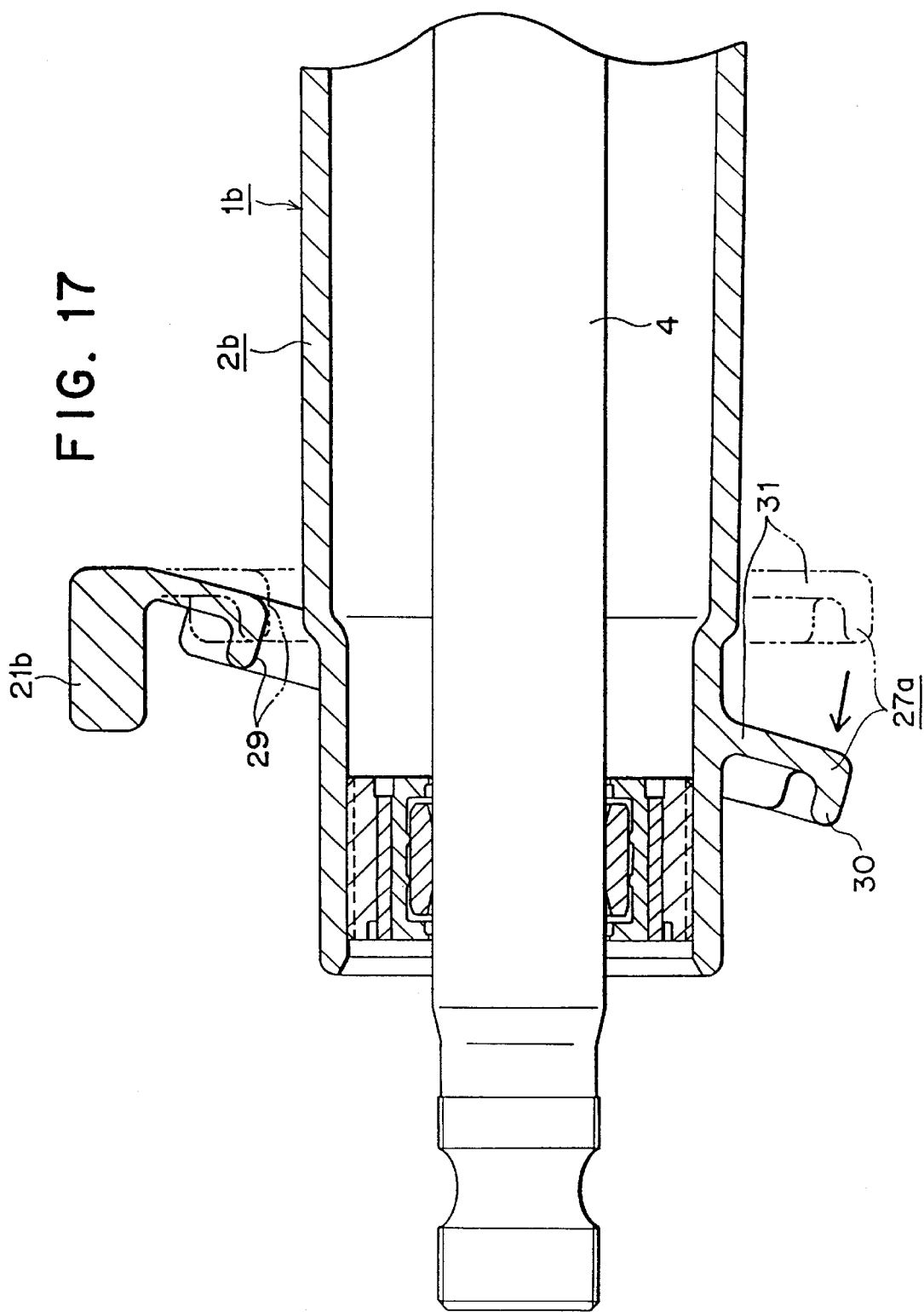
FIG. 17 is a sectional view similar to FIG. 15, showing a fifth embodiment of the present invention in the state where the secondary collision happens.

In the case of this embodiment having the above-described construction, when the steering column 2b as the steering column member is thrust forward upon the secondary collision, as illustrated in FIG. 17, continuous portions between both of upper and lower side ends of the suspension arm 27a constituting the shock absorbing member, the lower surface of the front steering column 2b and the lower surface of the front fitting member 21b, permit the front steering column 2b to displace forward while being plastically deformed in such a direction as to change a bending angle. When the continuous portions between both of upper and lower side ends of the suspension arm 27a constituting the shock absorbing member, the lower surface of the front steering column 2b and the lower surface of the front fitting member 21b are plastically deformed, the impact energy applied to the steering wheel from the driver's body is absorbed. Therefore, the driver can be protected by relieving the impact applied to the body of the driver. Particularly in the case of this embodiment, the lower side end of the suspension arm 27a is connected to the lower surface of the steering column 2b. It is therefore possible to protect the driver more surely by increasing a quantity of forward displacement of the front steering column 2b when the secondary collision happens as well as by elongating a distance (span) between the pair of upper and lower connecting members. Other configurations and operations are the same as those in the first embodiment discussed above, and hence the same components are marked with the like numerals with an omission of the repetitive explanations.

The present invention is constructed and operates as explained above, and it is therefore possible to actualize the shock absorbing steering column apparatus at the low costs by simplifying all of the parts manufacturing, the marts management and the assembly work.

What is claimed is:

1. A shock absorbing steering column apparatus, comprising:

a steering column member admitting an insertion of a steering shaft; and a shock absorbing member for permitting said steering column member to displace in an axial direction while being plastically deformed by an impact load applied in the axial direction of said steering column member, wherein said steering column member and said shock absorbing member are integrally formed of a non-ferrous metal, said shock absorbing member is constructed of a member, provided between a fitting member for fitting said steering column apparatus to a car body and said steering column member, and plastically deformed upon a secondary collision;

said plastically deformed member is provided in the axial direction between said fitting member and said steering column member; and said plastically de formed member includes a honey-combed structure.

2. A shock absorbing steering column apparatus according to claim 1, wherein said non-ferrous metal has a tensile strength of over 210 MPa and an elongation of 6–10%.

* * * * *